P. Casamajor,
Mode of Operating Oil Wells,
No. 50,903.                  Patented Nov. 14, 1865.
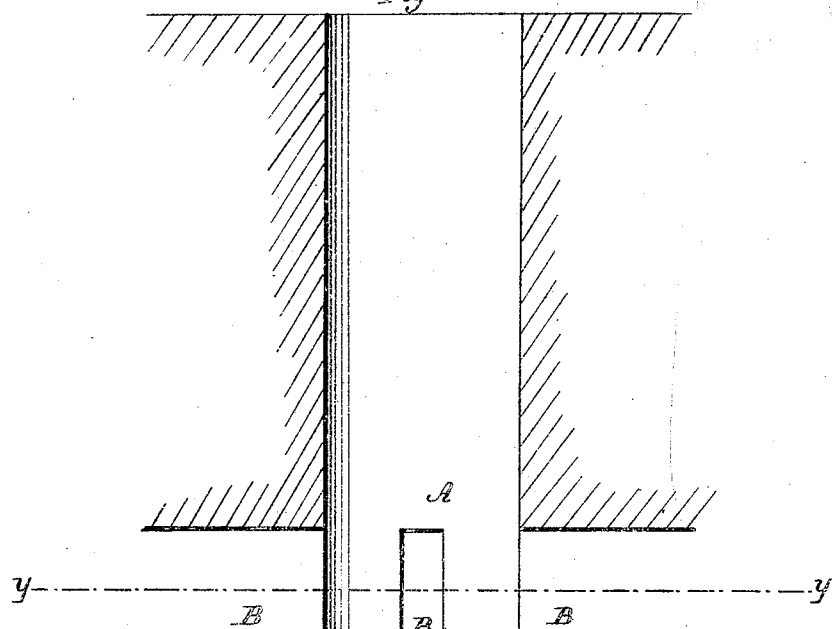
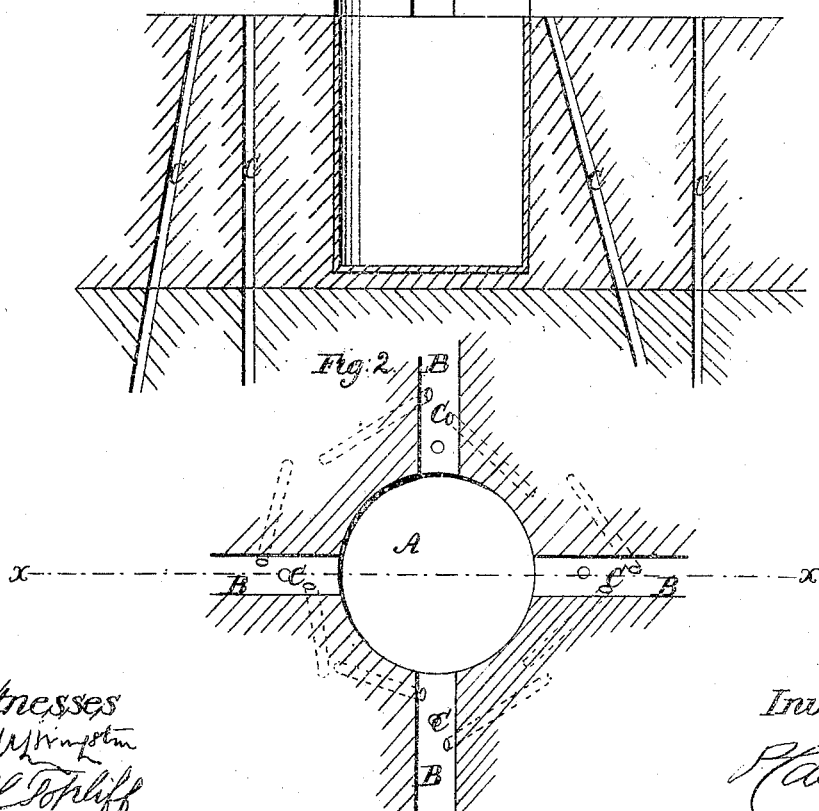
Witnesses                             Inventor;

UNITED STATES PATENT OFFICE.

PAUL CASAMAJOR, OF NEW YORK, N. Y.

IMPROVED MODE OF OPERATING OIL-WELLS.

Specification forming part of Letters Patent No. 50,903, dated November 14, 1865.

*To all whom it may concern:*

Be it known that I, PAUL CASAMAJOR, of the city, county, and State of New York, have invented a new and useful Improvement in Operating Oil-Wells; and I do hereby declare that the following is a full, clear, and exact description thereof, which will enable others skilled in the art to make and use the same, reference being had to the accompanying drawings, forming part of this specification, in which—

Figure 1 represents a vertical central section of this invention, the line *x x*, Fig. 2, indicating the plane of section. Fig. 2 is a horizontal section of the same, the plane of section being indicated by the line *y y*, Fig. 1.

Similar letters of reference indicate like parts.

This invention relates to an oil-well composed of a vertical main shaft with a series of horizontal or oblique galleries, and a series of drills extending from said galleries in a vertical or oblique direction. The main shaft terminates above the rock which contains the oil, and is provided at its bottom with a reservoir, in which all the oil rising through the drills collects, and whence it can be easily raised to the surface by a suitable pump. By these means all the oil contained in a large tract of land can be collected in one and the same reservoir, and all the secondary wells formed by the vertical or oblique drills can be converted into flowing wells, their depth being comparatively small, so that the labor of pumping is materially reduced by having one large pump to raise the oil from the reservoir.

A represents the main shaft, which is sunk in a vertical direction, terminating at a suitable distance above the rock which contains the oil. The bottom part of this shaft forms the reservoir in which all the oil collects, and in order to make the same capable of holding the oil it is lined with iron, wood, or masonry and hydraulic cement. From said main shaft extend a series of gangways or galleries, B, in a horizontal or oblique direction to any desired distance, and from each gallery are sunk a series of drills, C, in vertical or oblique directions, as clearly shown in the drawings. The galleries, of course, must be made sufficiently high and wide to enable persons to pass through freely and to work in the same in sinking the vertical or oblique drills C. Through these drills rises the oil, and it is obvious that they have to be made deep enough to strike the oil; but they commence at a considerable depth below the surface, and the depth of each drill is thus materially reduced, so that the oil readily rises to the top of the same, and all the Artesian wells are converted into flowing wells. By this arrangement all the oil contained in a large tract of land can be reached and made to collect in one and the same reservoir, from which the oil can be raised to the surface by one large pump.

I claim as new and desire to secure by Letters Patent—

An oil-well composed of a main shaft which terminates at a suitable distance above the rock containing the oil, and from which galleries extend in a horizontal or oblique direction, in combination with drills sunk from said galleries in a vertical or oblique direction, substantially in the manner and for the purpose set forth.

P. CASAMAJOR.

Witnesses:
M. M. LIVINGSTON,
C. L. TOPLIFF.